(12) United States Patent
Lin

(10) Patent No.: US 8,097,327 B2
(45) Date of Patent: Jan. 17, 2012

(54) TOUCH PANEL WITH AN ANTI-HIGHLIGHT STRUCTURE

(76) Inventor: Teh-Zheng Lin, Taoyuan (TW)

( * ) Notice: Subject to any disclaimer, the term of this patent is extended or adjusted under 35 U.S.C. 154(b) by 112 days.

(21) Appl. No.: 12/486,740

(22) Filed: Jun. 17, 2009

(65) Prior Publication Data

US 2010/0323157 A1 Dec. 23, 2010

(51) Int. Cl.
*G02B 5/00* (2006.01)
*G06F 3/041* (2006.01)
*G06F 3/045* (2006.01)
*G06F 3/042* (2006.01)

(52) U.S. Cl. ........ 428/141; 345/173; 345/174; 345/176; 345/177; 178/18.01; 178/18.02; 178/18.03

(58) Field of Classification Search .................. 428/141; 178/18.01, 18.02, 18.03; 345/173, 174, 176, 345/177
See application file for complete search history.

(56) References Cited

U.S. PATENT DOCUMENTS

| | | | |
|---|---|---|---|
| 6,348,960 B1* | 2/2002 | Etori et al. ..................... 349/112 |
| 6,419,366 B1* | 7/2002 | Namioka ....................... 359/601 |
| 6,771,327 B2* | 8/2004 | Sekiguchi ....................... 349/12 |
| 6,852,376 B2* | 2/2005 | Chien et al. ..................... 428/1.3 |
| 7,037,573 B2* | 5/2006 | Miyatake et al. .......... 428/195.1 |
| 7,221,508 B2* | 5/2007 | Maruta et al. ................. 359/459 |
| 7,233,378 B2* | 6/2007 | Obayashi et al. ............. 349/137 |
| 7,334,920 B2* | 2/2008 | Chang et al. ................... 362/326 |
| 2002/0142133 A1* | 10/2002 | Matsunaga et al. ........... 428/141 |
| 2002/0154100 A1* | 10/2002 | Hatakeda et al. ............. 345/173 |
| 2003/0076596 A1* | 4/2003 | Miyatake et al. ............. 359/601 |
| 2005/0152038 A1* | 7/2005 | Nishida et al. ................ 359/601 |
| 2005/0156907 A1* | 7/2005 | Sato et al. ..................... 345/173 |
| 2005/0207137 A1* | 9/2005 | Nishikawa et al. ............. 362/84 |
| 2006/0157289 A1* | 7/2006 | Chou ......................... 178/18.01 |
| 2007/0184260 A1* | 8/2007 | Saito et al. .................... 428/323 |
| 2007/0268587 A1* | 11/2007 | Ninomiya et al. ............ 359/601 |
| 2007/0292659 A1* | 12/2007 | Li et al. ......................... 428/141 |
| 2008/0286527 A1* | 11/2008 | Haga et al. .................... 428/143 |
| 2009/0022953 A1* | 1/2009 | Tsai et al. ...................... 428/148 |

* cited by examiner

*Primary Examiner* — Callie Shosho
*Assistant Examiner* — Nancy Rosenberg

(57) ABSTRACT

Anti highlight structure for a touch panel includes a touch film of a flexible transparent thin film, a substrate of a rigid transparent plate, and a touch sensing unit has two sheets of transparent conductive film arranged with a predetermined gap between the touch film and the substrate. It further includes an anti Newton-Ring layer of a transparent thin film having at least one uneven and rough surface thereof, and a light regulating layer of a transparent thin film. A plurality of transparent granular objects is bound in a transparent matrix of the light regulating layer. The transparent granular objects and the transparent matrix have different indexes of refraction. The transparent granular objects are made of at least one material. The lights will be corrected by the complex indexes of refraction within the light regulating layer so that the highlights causing an image distortion and deformation will be eliminated.

4 Claims, 1 Drawing Sheet

TOUCH PANEL WITH AN ANTI-HIGHLIGHT STRUCTURE

FIELD OF THE INVENTION

The present invention relates to anti highlight structure, and particular to an anti highlight touch panel applied to a touch panel or LCD with a anti Newton-Ring film.

DESCRIPTION OF THE PRIOR ART

Common resistive touch panel includes two sheets of transparent conductive film arranged with a predetermined gap. An upper conductive film is arranged to a bottom surface of a flexible transparent touch film, and a lower conductive film is arranged to an upper surface of the transparent glass substrate. A plurality of protruding spacers is arranged between the two conductive films so that a space is formed between the films. The substrate is attached to a bottom surface of the touch film with the conductive films sealed inside. As we all know, lights passing through such stacking plate mentioned above will have the Newton-Ring which damages image shown on the screen. An anti Newton-Ring (ANR) thin film is usually arranged in the touch panel to eliminate the interference stripe. Known ANR thin film is a thin film having an uneven and rough surface thereof, or having wrinkles or stripes arranged to the surface of the thin film so that the interference stripe will be distorted by the rough surface partially refracting or reflecting the lights passing through. But the protruding and concave structure will also condense or scatter the lights so that highlights will appear on the surface. The highlights will cause distortion of the image especially to the high resolution screen or high brightness LCD.

SUMMARY OF THE PRESENT INVENTION

Accordingly, the present invention provides an anti highlight structure for a touch panel by forming a light regulating layer to a touch panel having an anti Newton-Ring structure. The lights will be corrected by the complex indexes of refraction within the light regulating layer. The highlights formed by the condensing lights which cause an image distortion and deformation will be eliminated.

The anti highlight structure for a touch panel according to the present invention includes a touch film, substrate, touch sensing unit, anti Newton-Ring layer, and a light regulating layer. The touch film can be a flexible transparent film. The substrate is a transparent glass plate. The touch sensing unit has two sheets of transparent conductive film arranged with a predetermined gap. An upper conductive film is arranged to a surface of the transparent touch film, a lower conductive film is arranged to a surface of the transparent substrate. A plurality of protruding spacers is arranged between the two conductive films so that a space is formed within an effective area of the two conductive films. Glue is smeared around the effective area of the conductive films so that the substrate is attached to a bottom surface of the touch film with the touch sensing unit sealed inside. The anti Newton-Ring layer is a transparent thin film having at least one uneven and rough surface thereof. The light regulating layer is a transparent thin film having a plurality of transparent granular objects bound in a transparent matrix. The transparent granular objects and the transparent matrix have different indexes of refraction. The light regulating layer is arranged more away from the light source of the screen than the anti Newton-Ring does. The lights will be corrected by the complex indexes of refraction within the light regulating layer so that the highlights causing an image distortion and deformation will be eliminated.

Moreover, a thickness of the light regulating layer is preferably below 250 µm, and the spheral diameters of the transparent granular objects are between 0.1 µm to 15 µm. The transparent granular objects are made of at least one material. The matrix of the light regulating layer can be the acrylic.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
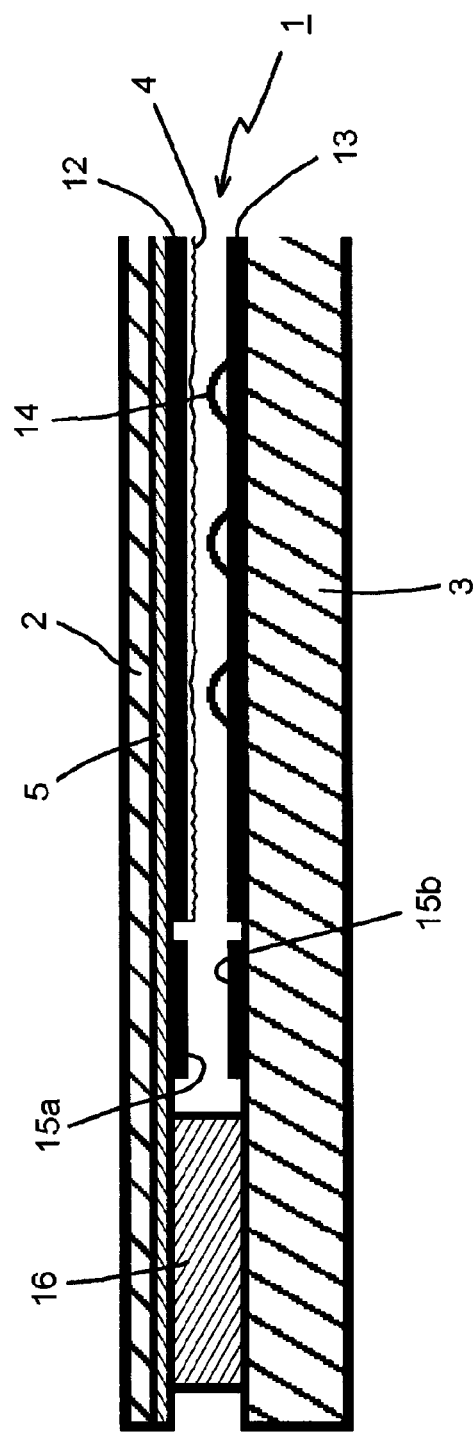
FIG. 1 is a cross section view showing an assembly of the components according to the present invention.
Figure 2:
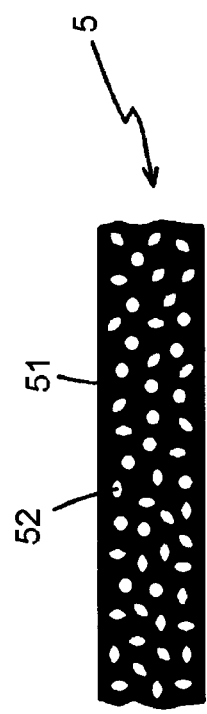
FIG. 2 is a cross section view showing a light regulating layer and a transparent matrix and transparent granular objects thereof.

Referring to FIG. 1, a cross section view showing an assembly of a preferable embodiment according to the present invention is illustrated. A touch panel includes a set of touch sensing unit 1, touch film 2, substrate 3, anti Newton-Ring layer 4, and a light regulating layer 5. The touch film 2 can be a flexible transparent film. The substrate 3 is a transparent glass plate. The touch sensing unit 1 has two sheets of transparent conductive film arranged with a predetermined gap. An upper conductive film 12 is arranged to a surface of the transparent touch film 2, a lower conductive film 13 is arranged to a surface of the transparent substrate 3. A plurality of protruding spacers 14 are arranged between the two conductive films 12 and 13 so that a space is formed within an effective area of the two conductive films. Metal conducting wires 15a and 15b are arranged to edges of the two conductive films 12 and 13 respectively. The metal conducting wires are connected to a signal output terminal so that a sensing signal of the touch panel can be transmitted to a succeeding signal processing circuit. Glue 16 is smeared around the effective area of the conductive films 12 and 13 so that the substrate 3 is attached to a bottom surface of the touch film 2 with the touch sensing unit 1 sealed inside. The anti Newton-Ring layer 4 is arranged to a bottom surface of the upper conductive film 12. An uneven and rough surface is arranged to the bottom surface as an anti Newton-Ring structure. The light regulating layer 5 is a transparent thin film arranged above the anti Newton-Ring layer 4. Referring to FIG. 2, a plurality of transparent granular objects 52 are bound in a transparent matrix 51. The transparent granular objects 52 and the transparent matrix 51 have different indexes of refraction. The transparent matrix 51 can be a plastic material such as the polycarbonate (PC), polyester (PET), Polymethylmethacrylate (PMMA), or the acrylic. The transparent granular object 52 can be a small granule of the glass, polycarbonate (PC), polyester (PET), or the Polymethylmethacrylate (PMMA). A thickness of the light regulating layer 5 is about 250 μm, and the spheral diameters of the transparent granular objects 52 are between 0.1 μm to 15 μm.

In the assembly of the above components, interference stripe of the lights will be eliminated while the lights passing through the anti Newton-Ring layer 4. The lights will continuous pass through the light regulating layer 5 so that directions of the lights will be corrected by the complex indexes of refraction within the layer. The highlights causing an image distortion and deformation will be eliminated.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A touch panel, comprising:
   a touch film (2) being a flexible transparent film;
   a substrate (3) being a transparent glass plate;
   a touch sensing unit (1) having two sheets of transparent conductive films arranged with a predetermined gap; an upper conductive film (12) being arranged below a lower surface of the transparent touch film (2); a lower conductive film (13) being arranged on a surface of the substrate (3);
   a plurality of protruding spacers (14) arranged on the lower conductive film (13) so that a space is formed within an effective area of the two conductive films;
   metal conducting wires (15*a*, 15*b*) arranged to edges of the two conductive films (12) and (13) respectively; the metal conducting wires being connected to a signal output terminal so that a sensing signal of the touch panel can be transmitted to a succeeding signal processing circuit;
   glue is around an effective area of the upper and lower conductive films (12, 13) so that the substrate (3) is attached to a bottom surface of the touch film (2) with the touch sensing unit (1) sealed inside;
   an anti Newton-Ring layer (4) attached to a bottom surface of the upper conductive film (12); the anti Newton-Ring layer (4) comprising an uneven and rough surface on a bottom surface of the anti-Newton-Ring layer as an anti Newton-Ring structure; and
   a light regulating layer (5) being a transparent thin film arranged above the anti Newton-Ring layer (4).

2. The touch panel as claimed in claim 1, wherein the light regulating layer is formed with a plurality of transparent granular objects (52) bound in a transparent matrix (51); the transparent granular objects (52) and the transparent matrix (51) have different indexes of refraction.

3. The touch panel as claimed in claim 2, wherein the transparent matrix is a plastic material selected from one of polycarbonate (PC), polyester (PET), Polymethylmethacrylate (PMMA), and acrylic; and materials from the transparent granular objects are selected from glass, polycarbonate (PC), polyester (PET), and Polymethylmethacrylate (PMMA).

4. The touch panel as claimed in claim 2, wherein a thickness of the light regulating layer is about 250 μm, and spherical diameters of the transparent granular objects are between 0.1 μm to 15 μm.

* * * * *